United States Patent
Hou et al.

(10) Patent No.: US 12,496,923 B2
(45) Date of Patent: Dec. 16, 2025

(54) REFRIGERANT AMOUNT MONITORING AND CHARGING CONTROL SYSTEM FOR ELECTRIC VEHICLE AND METHOD THEREOF

(71) Applicants: Hyundai Motor Company, Seoul (KR); Kia Corporation, Seoul (KR)

(72) Inventors: Qing Dong Hou, Yantai (CN); Xue Shan Tang, Yantai (CN); Chang Gi Ryu, Seoul (KR); Xiao Rui Zhai, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 679 days.

(21) Appl. No.: 17/898,197

(22) Filed: Aug. 29, 2022

(65) Prior Publication Data
US 2023/0158908 A1 May 25, 2023

(30) Foreign Application Priority Data
Nov. 24, 2021 (CN) .......................... 202111404984.6

(51) Int. Cl.
*H02J 7/00* (2006.01)
*B60L 53/16* (2019.01)
(Continued)

(52) U.S. Cl.
CPC ............. *B60L 53/302* (2019.02); *B60L 53/16* (2019.02); *H02J 7/0042* (2013.01);
(Continued)

(58) Field of Classification Search
CPC .. B60L 53/302; B60L 53/16; H02J 7/007192; H02J 7/0042
(Continued)

(56) References Cited

U.S. PATENT DOCUMENTS

| | | | |
|---|---|---|---|
| 9,701,210 B2 * | 7/2017 | Woo ........................ | B60L 53/11 |
| 2005/0086951 A1 * | 4/2005 | Dobmeier ............. | F25B 49/022 |
| | | | 62/131 |

(Continued)

FOREIGN PATENT DOCUMENTS

WO   WO-2011083976 A2 *   7/2011   ......... B60H 1/00278

*Primary Examiner* — Alexis B Pacheco
(74) *Attorney, Agent, or Firm* — Morgan Lewis & Bockius LLP

(57) ABSTRACT

A refrigerant amount monitoring and charging control system for an electric vehicle and a method thereof include: a controller; a battery management module electrically connected to the controller; a high-speed charging gun connected to the vehicle when the vehicle is charged and configured to generate a high-speed charging signal during performing high-speed charging and to send the high-speed charging signal to the controller; an ambient temperature sensor electrically connected to the controller and configured to obtain an ambient temperature and to send the obtained ambient temperature to the controller; and a chiller including an electronic expansion valve and an evaporator. A situation where a vehicle battery is unable to be cooled by a refrigerant due to an insufficient refrigerant amount may be prevented by controlling charging power based on a monitoring result of a current refrigerant amount.

14 Claims, 4 Drawing Sheets

(51) Int. Cl.
B60L 53/302 (2019.01)
H02J 7/14 (2006.01)

(52) U.S. Cl.
CPC ..... H02J 7/007192 (2020.01); *F25B 2500/19* (2013.01); *F25B 2600/2513* (2013.01)

(58) Field of Classification Search
USPC ......................................................... 320/134
See application file for complete search history.

(56) References Cited

U.S. PATENT DOCUMENTS

| | | | | |
|---|---|---|---|---|
| 2005/0204756 | A1* | 9/2005 | Dobmeier | F25B 49/005 62/149 |
| 2010/0107608 | A1* | 5/2010 | Mitsutani | B60L 50/16 60/299 |
| 2012/0262881 | A1* | 10/2012 | Onimaru | B60L 3/003 361/701 |
| 2013/0029193 | A1* | 1/2013 | Dyer | H01M 10/486 180/65.21 |
| 2016/0107526 | A1* | 4/2016 | Jin | B60L 7/10 307/10.1 |
| 2016/0190661 | A1* | 6/2016 | Kuruma | B60L 58/27 701/36 |
| 2016/0361990 | A1* | 12/2016 | Porras | B60L 1/02 |
| 2017/0358833 | A1* | 12/2017 | Jalilevand | H01M 10/663 |
| 2018/0215231 | A1* | 8/2018 | Porras | B60H 1/323 |
| 2019/0067973 | A1* | 2/2019 | Yamada | B60L 53/16 |
| 2020/0079203 | A1* | 3/2020 | Cosgrove | B60L 58/12 |
| 2020/0231024 | A1* | 7/2020 | Shrivastava | B60H 1/00978 |
| 2021/0086586 | A1* | 3/2021 | Chatham | B60H 1/00907 |
| 2021/0242518 | A1* | 8/2021 | Shrivastava | H01M 10/663 |
| 2022/0324288 | A1* | 10/2022 | Cohan | B60L 58/26 |
| 2023/0322045 | A1* | 10/2023 | Hammer | B60H 1/3229 62/132 |
| 2024/0055697 | A1* | 2/2024 | Ciaccio | H01M 10/613 |
| 2025/0153539 | A1* | 5/2025 | Jeong | B60H 1/00278 |

\* cited by examiner

REFRIGERANT AMOUNT MONITORING AND CHARGING CONTROL SYSTEM FOR ELECTRIC VEHICLE AND METHOD THEREOF

CROSS-REFERENCE TO RELATED APPLICATION

The present application claims priority to Chinese Patent Application No. 202111404984.6 filed in the Chinese National Intellectual Property Administration on Nov. 24, 2021, the entire contents of which is incorporated herein for all purposes by this reference.

BACKGROUND OF THE PRESENT DISCLOSURE

Field of the Present Disclosure

The present disclosure relates to charging an electric vehicle. More particularly, the present disclosure relates to a refrigerant amount monitoring and charging control system for an electric vehicle and a refrigerant amount monitoring and charging control method for an electric vehicle.

Description of Related Art

For a battery to satisfy a heat dissipation requirement in a high-power charging/discharging state and maintain a normal operating temperature in a daily operation, some conventional electric vehicles may cool a battery system by use of a coolant, and cool the battery coolant by additionally using a cooling medium or refrigerant, i.e., through a phase change of the refrigerant when the refrigerant passes through an evaporator. Therefore, it may be important to monitor a refrigerant amount when cooling the battery system.

In detail, a battery cooling system may include a coolant conduit, a coolant pump and a chiller, in which the coolant pump may drive the battery coolant to circulate in the coolant conduit. Here, the battery coolant may absorb heat from the battery when passing through the battery to cool the battery, and may be cooled when passing through an evaporator of the chiller shown in FIG. 1.

The chiller 6 shown in FIG. 1 may include an electronic expansion valve 61 and the evaporator 62, and the electronic expansion valve 61 and the evaporator 62 may be further connected to a compressor 64 and a condenser 65 through a refrigerant conduit 63. The refrigerant may circulate in the refrigerant conduit 63 as shown in FIG. 1. Here, a phase change (from liquid to gas) of the refrigerant may occur when the refrigerant passes through the evaporator 62, and the refrigerant may thus absorb heat, cooling the battery coolant passing through the evaporator. Once the refrigerant is insufficient or leaked, cooling of the battery coolant may be affected, a battery cooling capacity may be lowered, and in a severe case, a vehicle fire or the like may occur.

In a related art, a high-speed charging mode may be terminated only when a battery temperature exceeds a predetermined reference temperature (typically 60° C.). Here, when there is no refrigerant or the refrigerant is insufficient, the battery in a high temperature state may be inevitably cooled by natural wind. In the instant case, the battery is unable to be cooled in time due to a slow cooling rate, which may be very dangerous.

Therefore, it may be very important to monitor the refrigerant amount and control charging power.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a refrigerant amount monitoring and charging control system for an electric vehicle and a refrigerant amount monitoring and charging control method for an electric vehicle, which may monitor a refrigerant amount to control charging power, avoiding a risk of not being able to cool a battery in time due to the insufficient refrigerant amount.

According to various exemplary embodiments of the present disclosure, a refrigerant amount monitoring and charging control system for an electric vehicle including a controller; a battery management module electrically connected to the controller; a high-speed charging gun connected to the vehicle when the vehicle is charged and configured to generate a high-speed charging signal during performing high-speed charging and to send the high-speed charging signal to the controller; an ambient temperature sensor electrically connected to the controller and configured to obtain an ambient temperature and to send the obtained ambient temperature to the controller; and a chiller including an electronic expansion valve and an evaporator is provided. The electronic expansion valve may adjust an amount of a refrigerant passing through the evaporator based on a signal from a step motor of the electronic expansion valve, and the evaporator may cool a battery coolant through a phase change of the refrigerant when the refrigerant passes through the evaporator. The controller may be configured to determine an opening amount of the electronic expansion valve based on the signal from the step motor of the electronic expansion valve and determine a current refrigerant amount based on the ambient temperature and the opening amount of the electronic expansion valve. The controller may be configured to control the battery management module to reduce charging power when the determined current refrigerant amount is greater than a first reference value and less than or equal to a second reference value, and the controller may be configured to control the battery management module to terminate a high-speed charging mode when the determined current refrigerant amount is less than or equal to the first reference value.

The system may further include a battery coolant temperature sensor electrically connected to the controller and configured to obtain a battery coolant temperature and to send the obtained battery coolant temperature to the controller, wherein the controller is configured to control the battery management module to terminate the high-speed charging mode when the controller concludes that the battery coolant temperature is greater than or equal to a set value.

The system may further include a memory electrically connected to the controller and configured to store a mapping table, wherein a mapping relationship between the opening amount of the electronic expansion valve, the ambient temperature and the current refrigerant amount is recorded in the mapping table.

The controller may read the mapping table in the memory and determine the current refrigerant amount depending on the ambient temperature and the opening amount of the electronic expansion valve, based on the read mapping table.

The system may further include a notification module electrically connected to the controller, wherein the controller is configured to control the notification module to notify a user to replenish the refrigerant when the determined current refrigerant amount is greater than the first reference value and less than or equal to the second reference value, and the controller is configured to control the notification module to notify the user to replenish the refrigerant immediately when the determined current refrigerant amount is less than or equal to the first reference value.

According to various exemplary embodiments of the present disclosure, a refrigerant amount monitoring and charging control method for an electric vehicle including: receiving, by a controller, a high-speed charging signal indicating that high-speed charging is performed using a high-speed charging gun from the high-speed charging gun; receiving, by the controller, an ambient temperature from an ambient temperature sensor electrically connected to the controller; determining, by the controller, an opening amount of an electronic expansion valve based on a signal from a step motor of the electronic expansion valve; determining, by the controller, a current refrigerant amount based on the ambient temperature and the opening amount of the electronic expansion valve; reducing, by the controller, charging power when the determined current refrigerant amount is greater than a first reference value and less than or equal to a second reference value; and terminating, by the controller, the high-speed charging when the determined current refrigerant amount is less than or equal to the first reference value is provided. Here, the high-speed charging gun may generate the high-speed charging signal during performing the high-speed charging, and the electronic expansion valve of a chiller may adjust an amount of a refrigerant passing through an evaporator so that a battery coolant is cooled through a phase change of the refrigerant when the refrigerant passes through the evaporator.

The method may further include: receiving, by the controller, a battery coolant temperature from a battery coolant temperature sensor electrically connected to the controller; and terminating, by the controller, a high-speed charging mode when the battery coolant temperature is greater than or equal to a set value.

The memory may be electrically connected to the controller and store a mapping table, and a mapping relationship between the opening amount of the electronic expansion valve, the ambient temperature and the current refrigerant amount may be recorded in the mapping table.

The determining a current refrigerant amount based on the ambient temperature and the opening amount of the electronic expansion valve includes reading, by the controller, the mapping table in the memory, and determining, by the controller, the current refrigerant amount depending on the ambient temperature and the opening amount of the electronic expansion valve, based on the read mapping table.

The method may further include: notifying, by the controller, a user to replenish the refrigerant when the determined current refrigerant amount is greater than the first reference value and less than or equal to the second reference value; and notifying, by the controller, the user to replenish the refrigerant immediately when the determined current refrigerant amount is less than or equal to the first reference value.

The controller may be configured to control a battery management module to reduce the charging power or terminate the high-speed charging mode.

The controller may be configured to control a notification module to notify the user to replenish the refrigerant.

Various aspects of the present disclosure are directed to providing the following effects.

It is possible to save the cost by monitoring the current refrigerant amount, without additionally installing any further hardware.

It is possible to control the charging power based on the monitoring result of the current refrigerant amount. It is thus possible to prevent a situation of hardly cooling the battery due to the insufficient refrigerant when the battery temperature is excessively high.

Another effect which may be obtained or predicted by various exemplary embodiments of the present disclosure is disclosed directly or implicitly in the detailed description of various exemplary embodiments of the present disclosure. That is, various effects predicted by various exemplary embodiments of the present disclosure are included in the detailed description described below.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure

Figure 1:
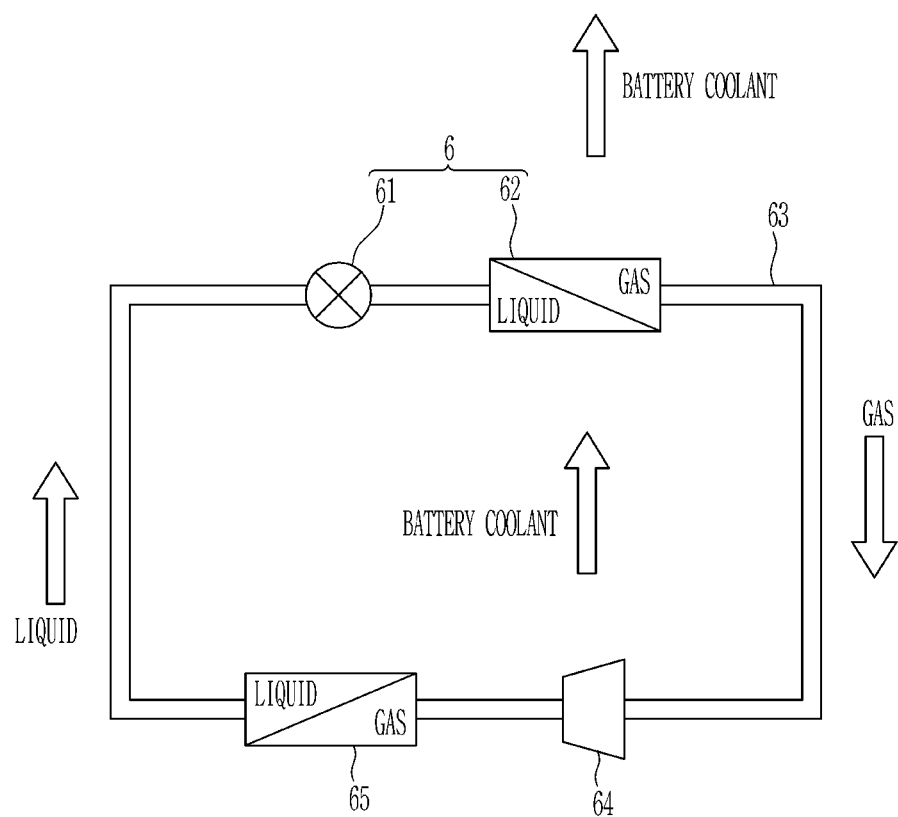
FIG. 1 is a diagram showing a principle that a chiller cools a battery coolant.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the description is made in detail based on various exemplary embodiments of the present disclosure, and describes examples of these exemplary embodiments below with reference to the drawings. Although the present disclosure is described in conjunction with exemplary embodiments of the present disclosure, the specification is not intended to limit the present disclosure to these exemplary embodiments of the present disclosure. To the contrary, the present disclosure not only includes exemplary embodiments of the present disclosure, but also includes various alternatives, modifications, equivalents and other exemplary embodiments falling within the spirit and scope of the present disclosure as defined in the claims.

Hereinafter, various exemplary embodiments of the present disclosure will be described in more detail with reference to the drawings.

When a battery is charged at a high speed, a battery temperature may exceed a reference value. In the instant case, a cooling capacity of a battery cooling system may already be insufficient. A compressor and a coolant pump may be operated at a predetermined rotation speed (e.g., for a specific vehicle model, a compressor may have a rotation speed of 4000 rotations/min, and a coolant pump may have a rotation speed of 3300 rotations/min). Superheat of the chiller may be maintained by controlling an open degree of an electronic expansion valve. When the opening amount of the electronic expansion valve exceeds a reference value, the system is unable to maintain an optimal superheat, and the cooling capacity of the battery cooling system may already be insufficient.

A stroke of the electronic expansion valve may be zero to 3 mm, a signal of a step motor of the electronic expansion valve may be controlled to zero to 180 mV, and the opening amount of the electronic expansion valve may be determined using the signal of the step motor. Under the assumption that the rotation speed of the compressor and the rotation speed of the coolant pump are constant, the opening amount of the electronic expansion valve may relate to an ambient temperature and a current refrigerant amount in the system. For example, when the ambient temperature is 40° C., the opening amount of the electronic expansion valve may be increased as the current refrigerant amount is reduced, and when the current refrigerant amount in the system is very small, the opening amount of the electronic expansion valve may reach a maximum value. That is, the signal of the step motor that is configured to control the opening amount of the electronic expansion valve may be 180 mV.

When taking a specific vehicle model as an exemplary embodiment of the present disclosure, when the ambient temperature is 40° C., the following is a principle of a current refrigerant amount monitoring system based on the opening amount of the electronic expansion valve.

When the signal of the step motor is less than 120 mV, the current refrigerant amount may have a normal value.

When the signal of the step motor is greater than 120 mV and less than 160 mV, the current refrigerant amount may be insufficient, a charging system may be required to limit charging power, and also required to notify a user to replenish a cooling medium, i.e., refrigerant, as soon as possible to ensure the cooling capacity of the battery cooling system.

When the signal of the step motor is greater than 160 mV, the current refrigerant amount may already be very small, and the cooling capacity of the battery cooling system may be seriously insufficient. Accordingly, a high-speed charging mode may be required to be stopped immediately.

Therefore, a method of monitoring the battery temperature may be replaced by a method of monitoring the current refrigerant amount.

Figure 2:
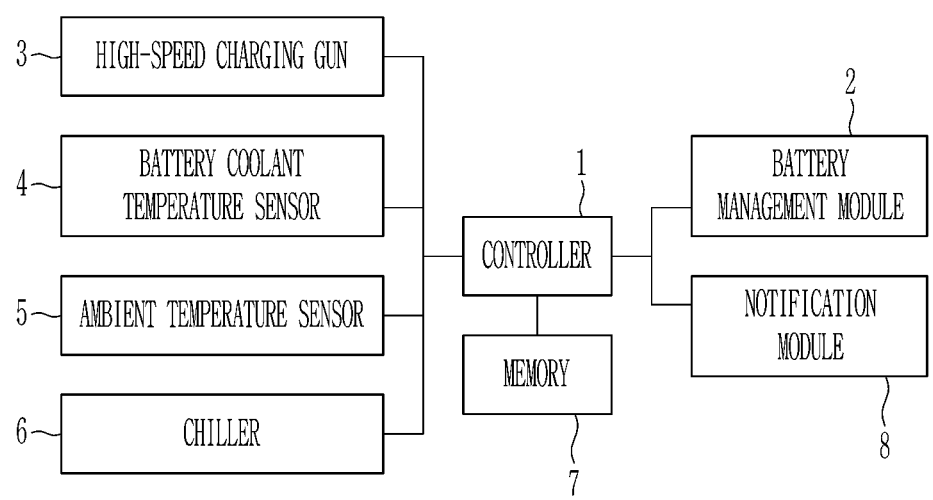
FIG. 2 is a block diagram of a refrigerant amount monitoring and charging control system for an electric vehicle according to various exemplary embodiments of the present disclosure.

An exemplary embodiment of various embodiments of the present disclosure relates to a refrigerant amount monitoring and charging control system for an electric vehicle. As shown in FIG. 2, the refrigerant amount monitoring and charging control system for the electric vehicle may include a controller 1, a battery management module 2, a high-speed charging gun 3, an ambient temperature sensor 5 and a chiller 6.

The battery management module 2 may be electrically connected to the controller 1. Under control of the controller 1, the battery management module 2 may manage the charging power of the battery.

The high-speed charging gun 3 may be connected to the vehicle when the vehicle is charged, generate a high-speed charging signal during performing high-speed charging, and send the high-speed charging signal to the controller 1, and the controller 1 may determine whether a vehicle battery is in a high-speed charging state based on the high-speed charging signal.

The ambient temperature sensor 5 may be electrically connected to the controller 1, obtain an ambient temperature, and send the obtained ambient temperature to the controller 1.

The chiller 6 may cool a battery coolant through a phase change of the refrigerant when the refrigerant passes through an evaporator 62. An electronic expansion valve 61 may adjust an amount of the refrigerant passing through the evaporator 62.

The controller 1 may determine an opening amount of the electronic expansion valve 61 based on a signal from a step motor of the electronic expansion valve 61, and determine a current refrigerant amount based on the ambient temperature and the opening amount of the electronic expansion valve 61.

The controller 1 may control the battery management module 2 to reduce the charging power when the determined current refrigerant amount is greater than a first reference value and less than or equal to a second reference value. For example, the battery management module 2 may appropriately reduce a charging current to reduce the charging power.

The controller 1 may control the battery management module 2 to terminate a high-speed charging mode when the determined current refrigerant amount is less than or equal to the first reference value.

The current refrigerant amount may be sufficient when the determined current refrigerant amount is greater than the second reference value, and the controller 1 may thus control the battery management module 2 to normally charge the battery.

In detail, the second reference value may be greater than the first reference value. Furthermore, for a specific vehicle model as an exemplary embodiment of the present disclosure, when a standard refrigerant amount is 600 g, the first reference value may be set to 300 g (50%), and the second reference value may be set to 420 g (70%). It is to be understood that the first reference value and the second reference value for another vehicle model may be different from these values.

The first reference value may indicate a threshold value of the current refrigerant amount, and when the first reference value is lower than the present threshold value, the current refrigerant amount may be very small and may not be sufficient to cool the battery coolant. In the instant case, it may be required to stop the high-speed charging immediately so that the battery temperature is not excessively high. The second reference value may indicate a normal value of the current refrigerant amount, and when the current refrigerant amount is less than or equal to the normal value and greater than the threshold value, the refrigerant may start to be insufficient, and still cool the battery coolant. Here, the charging power may be required to be appropriately reduced. For example, the charging power may be reduced from 100 kw to 50 kw.

The chiller 6 is a component for cooling the battery coolant, and may include the electronic expansion valve 61 and the evaporator 62. The electronic expansion valve 61 and the evaporator 62 may be additionally connected to a compressor 64 and a condenser 65 through a refrigerant conduit 63. The refrigerant may circulate in the refrigerant conduit 63. Here, a phase change (from gas to liquid) of the refrigerant may occur when the refrigerant passes through the condenser 65 to dissipate heat, and a phase change (from liquid to gas) of the refrigerant may occur when the refrigerant passes through the evaporator 62 to absorb heat. The battery coolant may pass through the evaporator 62, the refrigerant may absorb heat while being evaporated in the evaporator 62 to cool the battery coolant, and the cooled battery coolant may continue to circulate to cool the battery. Furthermore, the electronic expansion valve 61 may adjust the amount of the refrigerant passing through the evaporator 62.

Furthermore, the ambient temperature sensor 5 may be mounted on a front grill shutter.

Furthermore, the refrigerant amount monitoring and charging control system for the electric vehicle may further include a memory 7. The memory 7 may be electrically connected to the controller 1, and store a mapping table. A mapping relationship between the opening amount of the electronic expansion valve 61, the ambient temperature and the current refrigerant amount may be recorded in the mapping table.

The relationship between the opening amount of the electronic expansion valve 61 and the current refrigerant amount at different ambient temperatures may be different. It is possible to test the relationship between the opening amount of the electronic expansion valve 61 and the current refrigerant amount at the different ambient temperatures, and the mapping relationship between the ambient temperature, the opening amount of the electronic expansion valve and the current refrigerant amount may be recorded in the mapping table based on these test data. Accordingly, the current refrigerant amount may be estimated based on the ambient temperature and the opening amount of the electronic expansion valve by use of the mapping table. It is possible to prepare for the determination of the current refrigerant amount by storing the mapping table in the memory in advance.

In various exemplary embodiments of the present disclosure, the signal from the step motor may indicate the opening amount of the electronic expansion valve 61, and the present opening amount may be recorded in the mapping table. For example, Table 1 shows a mapping table for the predetermined vehicle type.

TABLE 1

| Ambient temperature | Refrigerant amount/g | | | | | | | | | | | | | | | | | | |
|---|---|---|---|---|---|---|---|---|---|---|---|---|---|---|---|---|---|---|---|
| | 150 | 175 | 200 | 225 | 250 | 275 | 300 | 325 | 350 | 375 | 400 | 425 | 450 | 475 | 500 | 525 | 550 | 575 | 600 |
| 40° C. | 180 | 180 | 180 | 180 | 170 | 143 | 132 | 126 | 124 | 122 | 119 | 117 | 114 | 113 | 109 | 104 | 102 | 101 | 97 |
| 30° C. | 180 | 180 | 180 | 180 | 165 | 139 | 130 | 123 | 120 | 118 | 117 | 114 | 113 | 108 | 103 | 101 | 100 | 99 | 96 |
| 20° C. | 180 | 180 | 180 | 175 | 142 | 131 | 125 | 122 | 121 | 118 | 116 | 113 | 111 | 107 | 102 | 100 | 97 | 95 | 94 |
| 10° C. | 180 | 180 | 175 | 160 | 140 | 130 | 122 | 120 | 118 | 117 | 112 | 110 | 106 | 101 | 100 | 98 | 96 | 94 | 90 |
| 0° C. | 180 | 170 | 163 | 153 | 135 | 122 | 120 | 117 | 116 | 115 | 110 | 104 | 100 | 98 | 95 | 93 | 92 | 90 | 85 |

Furthermore, the refrigerant amount monitoring and charging control system for the electric vehicle may further include a battery coolant temperature sensor 4. The battery coolant temperature sensor 4 may be electrically connected to the controller 1, obtain a battery coolant temperature, and send the obtained battery coolant temperature to the controller 1. The controller 1 may control the battery management module 2 to terminate the high-speed charging mode when the controller concludes that the battery coolant temperature is greater than or equal to a set value.

The battery coolant temperature sensor 4 may be provided at a battery inlet of a coolant conduit. That is, the battery coolant temperature detected by the battery coolant temperature sensor 4 may be the battery coolant temperature before the battery is cooled. An entire cooling system may already be failed due to another cause when the battery coolant temperature detected at the battery inlet of the coolant conduit already exceeds the set value. In the instant case, it may not be meaningful to determine the charging mode and the charging power by use of a monitoring result of the refrigerant amount, and the high-speed charging mode may thus be terminated immediately.

For example, for a specific vehicle model, the set value may be 25° C.

In Table 1, the first and second rows indicate the refrigerant amount, the first column indicates the ambient temperature, and the remaining intermediate values each indicates the opening amount (mV) of the electronic expansion valve 61 represented by the signal from the step motor.

Furthermore, the signal from the step motor of the electronic expansion valve 61 may be generally generated by a dedicated processor professionally controlling the step motor, and the signal from the step motor of the electronic expansion valve 61 may be sent from the dedicated processor to the controller 1. In detail, the dedicated processor may be separately provided, and then be electrically connected to the controller 1, or the dedicated processor may be integrated into the controller 1.

Furthermore, the controller 1 may read the mapping table in the memory 7 and determine the current refrigerant amount depending on the ambient temperature and the opening amount of the electronic expansion valve 61 based on the read mapping table.

Under the assumption that a rotation speed of the compressor and a rotation speed of the coolant pump are constant, the opening amount of the electronic expansion valve 61 may relate to the ambient temperature and the current refrigerant amount in the system, and the current refrigerant amount may be determined using the present relationship. As described above, the mapping table showing the recorded mapping relationship between the ambient temperature, the opening amount of the electronic expansion valve and the current refrigerant amount may be stored in the memory 7 in advance. The controller 1 may be required to first read the mapping table in the memory. The reason is that the controller 1 may determine the current refrigerant amount depending on the opening amount of the electronic expansion valve and the ambient temperature already determined above, based on the read mapping table.

In an exemplary embodiment described above, the battery management module 2 may be controlled to manage the charging mode and the charging power only by the controller 1. Furthermore, the user may be notified that the refrigerant needs to be replenished, ensuring a normal operation of the cooling system.

Furthermore, the refrigerant amount monitoring and charging control system for the electric vehicle may further include a notification module 8 electrically connected to the controller 1.

The controller 1 may control the notification module 8 to notify the user to replenish the refrigerant as soon as possible when the determined current refrigerant amount is greater than the first reference value and less than or equal to the second reference value.

The controller 1 may control the notification module 8 to notify the user to replenish the refrigerant immediately when the determined current refrigerant amount is less than or equal to the first reference value.

The notification module 8 may be a center fascia of the vehicle. That is, the user may be notified to replenish the refrigerant immediately or as soon as possible in a form of displaying text, image or the like on the screen of the center fascia and/or in a form of broadcasting a voice or sending an alarm as sound of the center fascia.

Here, a selection of the center fascia as the notification module is merely an example, a type of the notification module is not limited thereto, and may be any form in the related art as long as the notification module implements the above-described functions.

The refrigerant amount monitoring and charging control system for the electric vehicle according to the exemplary embodiment of the present disclosure may prevent a failure to cool the battery in time due to the insufficient refrigerant amount by managing the charging power based on the refrigerant amount.

Figure 3:
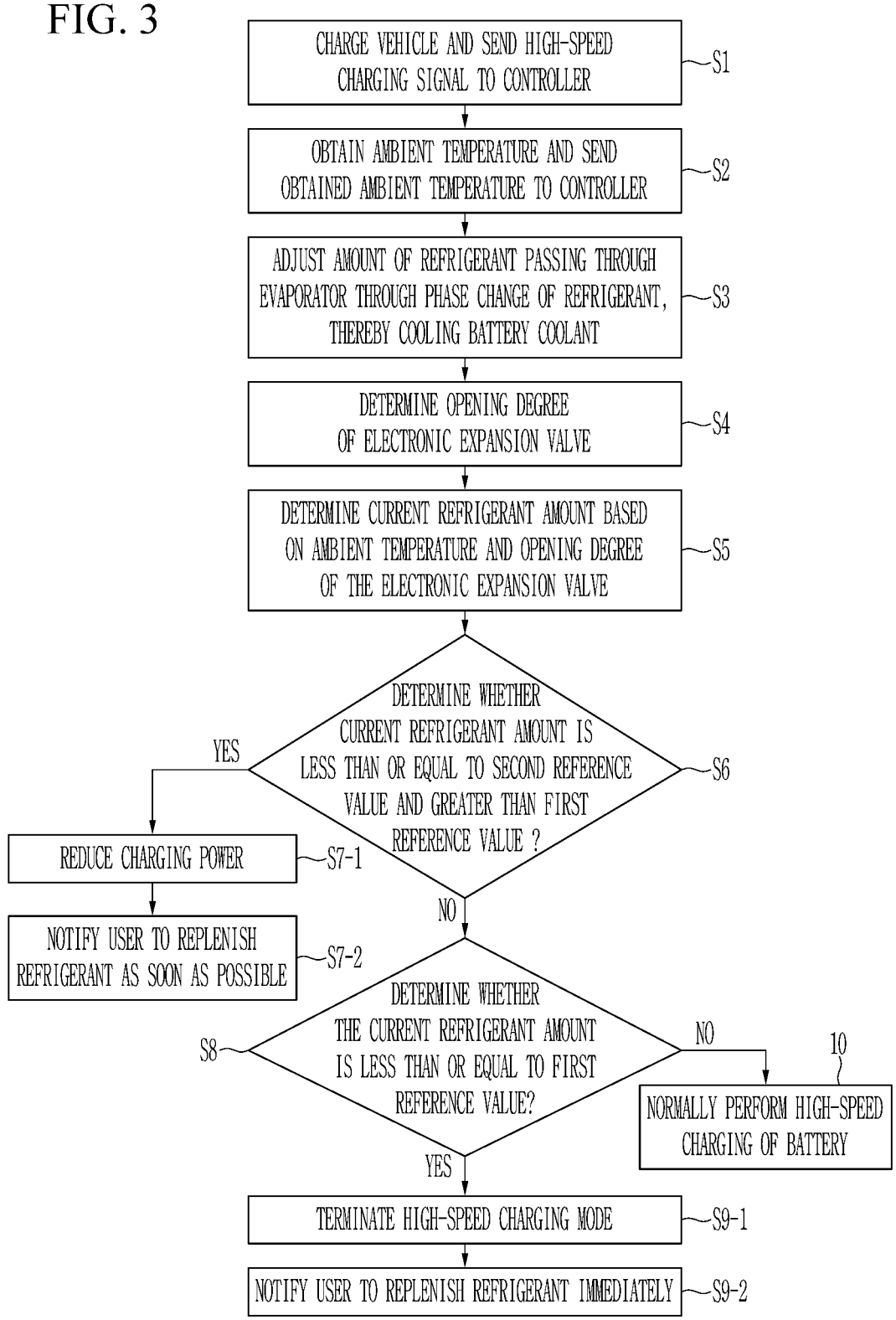
FIG. 3 is a flowchart of a refrigerant amount monitoring and charging control method for an electric vehicle according to various exemplary embodiments of the present disclosure.

Additionally, another exemplary embodiment of various embodiments of the present disclosure relates to a refrigerant amount monitoring and charging control method for an electric vehicle, which utilizes the above-described refrigerant amount monitoring and charging control system for the electric vehicle. As shown in FIG. 3, the refrigerant amount monitoring and charging control method for the electric vehicle may include the following steps.

In step S1, the vehicle may be charged using the high-speed charging gun 3. The high-speed charging gun 3 may generate the high-speed charging signal during performing the high-speed charging and send the high-speed charging signal to the controller 1.

The controller 1 may determine that the vehicle battery is in the high-speed charging state when receiving the high-speed charging signal sent by the high-speed charging gun 3, and start a subsequent charging control method.

In step S2, the ambient temperature may be obtained using the ambient temperature sensor 5, and the obtained ambient temperature may be sent to the controller 1.

In step S3, the amount of the refrigerant passing through the evaporator 62 may be adjusted using the electronic expansion valve 61 of the chiller 6, and the refrigerant may thus absorb heat through the phase change (i.e., evaporation) of the refrigerant when the refrigerant passes through the evaporator 62, cooling the battery coolant.

In step S4, the opening amount of the electronic expansion valve 61 may be determined by the controller 1 based on the signal from the step motor of the electronic expansion valve 61.

In step S5, the current refrigerant amount may be determined by the controller 1 based on the ambient temperature and the opening amount of the electronic expansion valve 61.

In step S6, it may be determined by the controller 1 whether the current refrigerant amount is less than or equal to the second reference value and greater than the first reference value.

Steps S7-1 and S7-2 may be performed when a determination result in the step S6 is 'Yes', and step S8 may be performed when the determination result in the step S6 is 'No'.

In the step S7-1, the battery management module 2 may be controlled to reduce the charging power by the controller 1.

In the step S7-2, the notification module 8 may be controlled to notify the user to replenish the refrigerant as soon as possible by the controller 1.

In the step S8, it may be determined by the controller 1 whether the current refrigerant amount is less than or equal to the first reference value.

Steps 9-1 and S9-2 may be performed when a determination result of the step S8 is 'Yes', and step S10 may be performed when the determination result of the step S8 is 'No'.

In the step S9-1, the battery management module 2 may be controlled to terminate the high-speed charging mode by the controller 1.

In the step S9-2, the notification module 8 may be controlled to notify the user to replenish the refrigerant immediately by the controller 1.

In the step S10, the high-speed charging of the battery may be normally performed. The current refrigerant amount may be sufficient when the determined current refrigerant amount is greater than the second reference value, there is no need to terminate the high-speed charging mode, there is no need to reduce the charging power, and the high-speed charging may be normally performed.

Figure 4:
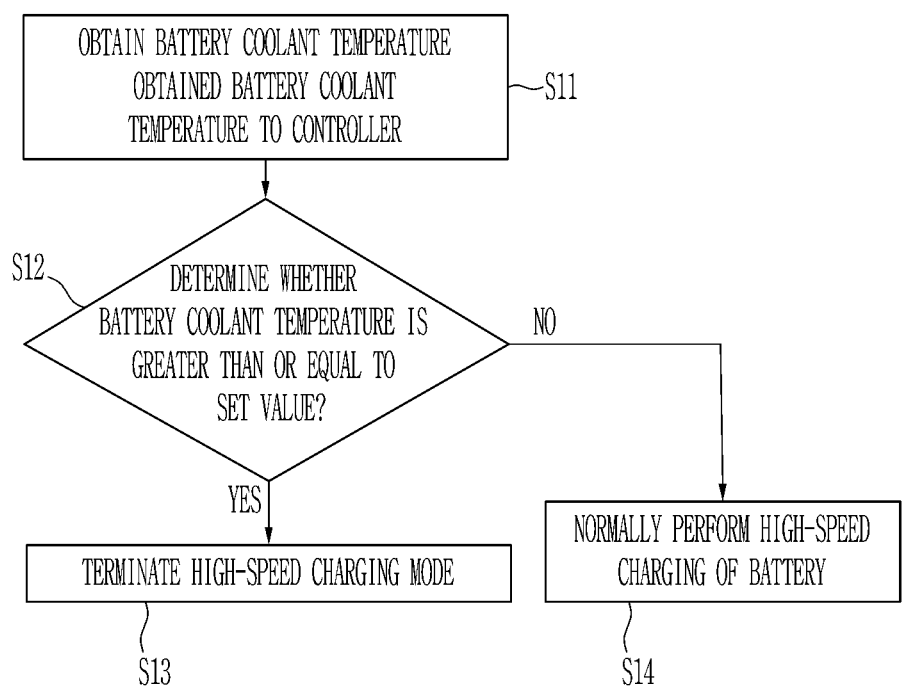
FIG. 4 is a flowchart showing that charging is controlled based a temperature of a battery coolant.

As shown in FIG. 4, the refrigerant amount monitoring and charging control method for the electric vehicle may further include the following steps.

In step S11, the battery coolant temperature may be obtained using the battery coolant temperature sensor 4, and the obtained battery coolant temperature may be sent to the controller 1.

In step S12, it may be determined by the controller 1 whether the battery coolant temperature is greater than or equal to the set value.

Step 13 may be performed when a determination result of the step S12 is 'Yes', and step S14 may be performed when the determination result of the step S12 is 'No'.

In the step S13, the battery management module 2 may be controlled to terminate the high-speed charging mode by the controller 1.

In the step S14, the high-speed charging of the battery may be normally performed.

The mapping table may be first stored in the memory 7 in advance before the vehicle is charged using the high-speed charging gun 3, and the mapping table may show the recorded mapping relationship between the opening amount of the electronic expansion valve 61, the ambient temperature and the current refrigerant amount.

The relationship between the opening amount of the electronic expansion valve and the current refrigerant amount at the different ambient temperatures may be different. It is possible to test the relationship between the opening amount of the electronic expansion valve 61 and the current refrigerant amount at the different ambient temperatures, and the mapping relationship between the ambient temperature, the opening amount of the electronic expansion valve and the current refrigerant amount may be recorded in the mapping table, based on these test data. Accordingly, the current refrigerant amount may be estimated based on the ambient temperature and the opening amount of the electronic expansion valve by use of the mapping table. It is possible to prepare for the determination of the current refrigerant amount by storing the mapping table in the memory in advance.

Furthermore, the step S5 of determining, by the controller 1, the current refrigerant amount based on the ambient temperature and the opening amount of the electronic expansion valve 61 may specifically include reading, by the controller 1, the mapping table in the memory 7, and determining the current refrigerant amount depending on the ambient temperature and the opening amount of the electronic expansion valve 61, based on the read mapping table.

Under the assumption that the rotation speed of the compressor and the rotation speed of the coolant pump are constant, the opening amount of the electronic expansion valve 61 may relate to the ambient temperature and the current refrigerant amount in the system, and the current refrigerant amount may be determined using the present relationship. As described above, the mapping table showing the recorded mapping relationship between the ambient temperature, the opening amount of the electronic expansion valve and the current refrigerant amount may be stored in the memory 7 in advance. The controller 1 may be required to first read the mapping table in the memory 7. The reason is that the controller 1 may determine the current refrigerant amount depending on the opening degree of the electronic expansion valve and the ambient temperature already determined above, based on the read mapping table.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A refrigerant amount monitoring and charging control system for an electric vehicle, the system comprising:
   a controller;
   a battery management module electrically connected to the controller;

a high-speed charging gun connected to the vehicle when the vehicle is charged and configured to generate a high-speed charging signal during performing high-speed charging and to send the high-speed charging signal to the controller;

an ambient temperature sensor electrically connected to the controller and configured to obtain an ambient temperature and to send the obtained ambient temperature to the controller; and a chiller including an electronic expansion valve and an evaporator, wherein the electronic expansion valve is configured to adjust an amount of a refrigerant passing through the evaporator based on a signal from a step motor of the electronic expansion valve, and the evaporator is configured to cool a battery coolant through a phase change of the refrigerant when the refrigerant passes through the evaporator, wherein the controller is configured to determine an opening amount of the electronic expansion valve based on the signal from the step motor of the electronic expansion valve and to determine a current refrigerant amount based on the ambient temperature and the opening amount of the electronic expansion valve, and wherein the controller is configured to control the battery management module to reduce charging power based on that the determined current refrigerant amount is greater than a first reference value and less than or equal to a second reference value, and to control the battery management module to terminate the high-speed charging when the determined current refrigerant amount is less than or equal to the first reference value.

2. The system of claim 1, further including a battery coolant temperature sensor electrically connected to the controller and configured to obtain a battery coolant temperature and to send the obtained battery coolant temperature to the controller, wherein the controller is configured to control the battery management module to terminate the high-speed charging when the controller concludes that the battery coolant temperature is greater than or equal to a set value.

3. The system of claim 1, further including:

a memory electrically connected to the controller and configured to store a mapping table, wherein a mapping relationship between the opening amount of the electronic expansion valve, the ambient temperature and the current refrigerant amount is recorded in the mapping table.

4. The system of claim 3, wherein the controller is configured to read the mapping table in the memory and to determine the current refrigerant amount depending on the ambient temperature and the opening amount of the electronic expansion valve, based on the read mapping table.

5. The system of claim 1, further including:

a notification module electrically connected to the controller, wherein the controller is configured to control the notification module to notify a user to replenish the refrigerant when the determined current refrigerant amount is greater than the first reference value and less than or equal to the second reference value.

6. The system of claim 5, wherein the controller is further configured to control the notification module to notify the user to replenish the refrigerant when the determined current refrigerant amount is less than or equal to the first reference value.

7. A refrigerant amount monitoring and charging control method for an electric vehicle, the method comprising:

receiving, by a controller, a high-speed charging signal indicating that high-speed charging is performed using a high-speed charging gun from the high-speed charging gun;

receiving, by the controller, an ambient temperature from an ambient temperature sensor electrically connected to the controller;

determining, by the controller, an opening amount of an electronic expansion valve based on a signal from a step motor of the electronic expansion valve;

determining, by the controller, a current refrigerant amount based on the ambient temperature and the opening amount of the electronic expansion valve;

reducing, by the controller, charging power when the determined current refrigerant amount is greater than a first reference value and less than or equal to a second reference value; and terminating, by the controller, the high-speed charging when the determined current refrigerant amount is less than or equal to the first reference value, wherein the high-speed charging gun is configured to generate the high-speed charging signal during performing the high-speed charging, and wherein the electronic expansion valve of a chiller is configured to adjust an amount of a refrigerant passing through an evaporator so that a battery coolant is cooled through a phase change of the refrigerant when the refrigerant passes through the evaporator.

8. The method of claim 7, further including:

receiving, by the controller, a battery coolant temperature from a battery coolant temperature sensor electrically connected to the controller; and terminating, by the controller, the high-speed charging when the battery coolant temperature is greater than or equal to a set value.

9. The method of claim 7, wherein a memory is electrically connected to the controller and is configured to store a mapping table, and wherein a mapping relationship between the opening amount of the electronic expansion valve, the ambient temperature and the current refrigerant amount is recorded in the mapping table.

10. The method of claim 9, wherein the determining a current refrigerant amount based on the ambient temperature and the opening amount of the electronic expansion valve includes:

reading, by the controller, the mapping table in the memory, and determining, by the controller, the current refrigerant amount depending on the ambient temperature and the opening amount of the electronic expansion valve, based on the read mapping table.

11. The method of claim 7, further including:

notifying, by the controller, a user to replenish the refrigerant when the determined current refrigerant amount is greater than the first reference value and less than or equal to the second reference value.

12. The method of claim 11, further including:

notifying, by the controller, the user to replenish the refrigerant when the determined current refrigerant amount is less than or equal to the first reference value.

13. The method of claim 7, wherein the controller is configured to control a battery management module electrically connected to the controller to reduce the charging power or terminate the high-speed charging.

14. The method of claim 11, wherein the controller is configured to control a notification module electrically connected to the controller to notify the user to replenish the refrigerant.

* * * * *